(Model.)
T. KRESEEN.
VEHICLE SEAT.
No. 247,067. Patented Sept. 13, 1881.
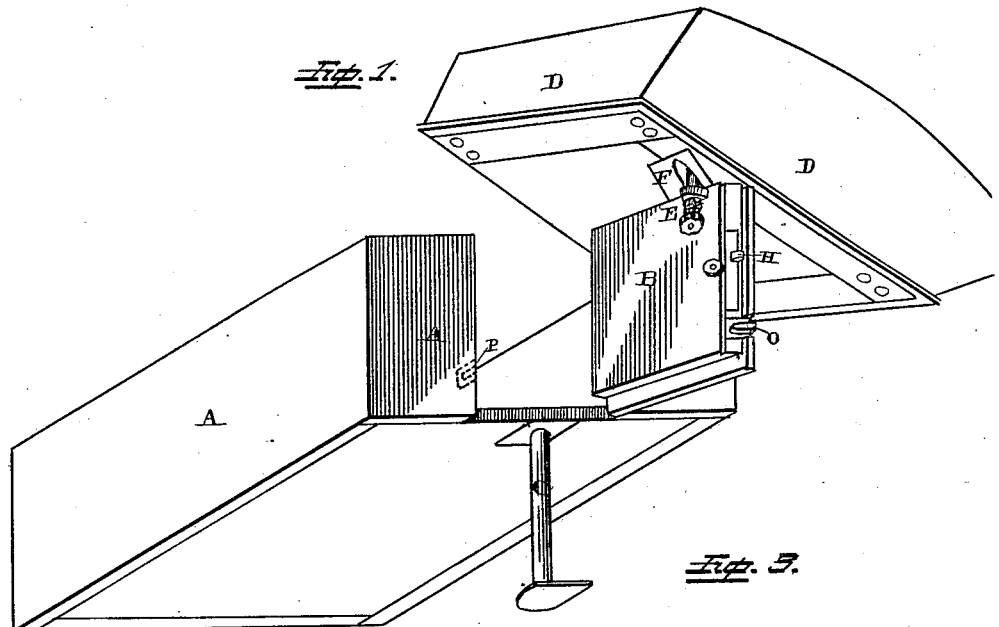
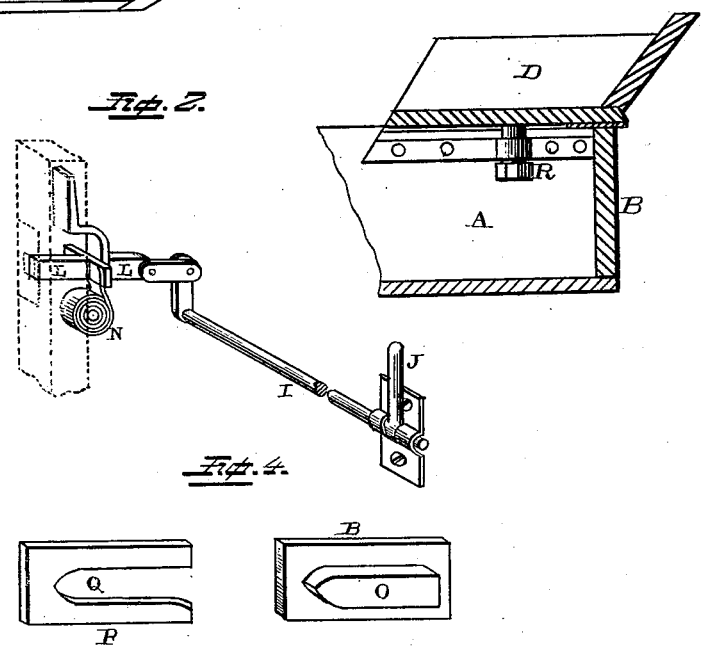
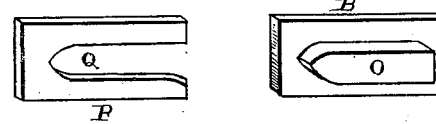
Witnesses:
W. W. Mortimer
A. C. Kiskadden
Inventor:
Theo. Kreseen,
per
F. A. Lehmann,
Atty

UNITED STATES PATENT OFFICE.

THEODOR KRESEEN, OF YOUNG AMERICA, INDIANA.

VEHICLE-SEAT.

SPECIFICATION forming part of Letters Patent No. 247,067, dated September 13, 1881.

Application filed July 9, 1881. (Model.)

*To all whom it may concern:*

Be it known that I, THEODOR KRESEEN, of Young America, in the county of Cass and State of Indiana, have invented certain new and useful Improvements in Vehicles; and I do hereby declare the following to be a full, clear, and exact description of the invention, such as will enable others skilled in the art to which it pertains to make and use it, reference being had to the accompanying drawings, which form part of this specification.

My invention relates to an improvement in vehicles; and it consists in placing a seat immediately over the door which is made in the rear end of the body, and pivoting this seat at one end to the body and connecting it to the door, so that when the door is opened outward the seat will swing back out of the way, so as to allow persons to get in and out of the rear end of the vehicle.

The object of my invention is to place a seat over the door which is made in the rear end of the body of the vehicle, and to make this seat move back and forth with the door, so that persons can readily enter and pass out through the end of the vehicle without having to climb over the sides.

Figure 1 is a perspective of the end of the body, showing the seat and door opened outward. Fig. 2 is a perspective of the bolt mechanism. Fig. 3 is a detail view of the hinge or pivot by which the seat is connected to the wagon-body. Fig. 4 is a detail view of the device by which the door is raised into position as it is being closed.

A represents the body of a vehicle, which has the door B in its rear end, and which is provided with the step C, as shown.

Pivoted at one end to the side of the body A by the bolt R is the seat D, which seat is connected to the top edge of the door by means of a bolt, E, so that when the door is opened and closed the seat will swing back and forth with it. This bolt E has its upper end passed through a plate, F, which is attached to the seat D, and which plate has a straight slot made through it, as shown. This seat being pivoted to the body A, and being connected to the door B by means of the bolt E and slotted plate F, it will readily be seen that whenever the door is opened outward the seat is moved back so as to allow persons to freely enter or pass out at the end of the body, and that when the door is closed the seat will be swung around into position directly across the end of the body. By means of this construction persons can freely enter and pass out at the end of the vehicle without having to climb over its sides, as heretofore.

Secured to the edge of the door is an ordinary spring-bolt, H, which catches inside of the end of the body when the door is swung shut, and which bolt latches the door in the usual manner. As this bolt is placed under the seat, where it would be inconvenient to readily reach it, special mechanism is provided, so that persons, either while sitting on the seat or after they have risen up, can unbolt the door, so that it and the seat will swing back out of the way.

In suitable bearings upon the side of the body is the rod I, which is provided at its forward end with the handle or lever J. This rod is bent at its rear end so as to pass around the end of the body, and connected to it is a slide, L. This slide is held in position by suitable guides just opposite to the bolt H, and when the slide is moved toward the bolt by pulling upon the lever J the bolt is pushed back into the door, so that it will no longer catch against the inner side of the body, and thus the door is left free to open. As soon as the lever J is released a spring, N, forces the slide back into position, so that the bolt can freely latch inside of the body when the door is again closed.

All doors, and especially where there is any weight brought to bear upon them, will sag more or less after they have been in use a short time; and in order to cause this door to rise into position as it is being closed, I attach to one edge of the door a projection, O, which has its outer edge tapered or beveled, as shown. In or to the edge of the body is secured a metallic plate, P, which has a corresponding-shaped recess, Q, made in it, and into which recess the tapered end of the projection catches as the door is swung around. Unless the door sags to such an extent that this tapered end cannot enter the recess, this projection will serve to raise the door upward as the projection enters the recess, and thus lift the door into position, so that it will readily close. This device for raising the door is applicable not only for use in this particular place, but in all other places where the door shows a tendency to sag.

Having thus described my invention, I claim—

1. The combination of the body of a vehicle having a door made in its side or end with a seat which is pivoted at one end to the body and connected to the door, so that when the door is opened or closed the seat will move back and forth with it.

2. The combination of the body A, provided with a door in its side or end, the pivot G, the bolt E, the seat D, and a slotted plate, F, substantially as described.

In testimony whereof I affix my signature in presence of two witnesses.

THEODOR KRESEEN.

Witnesses:
ABRAHAM JOHNSON,
WILLIAM NOLON.